Figure 1:
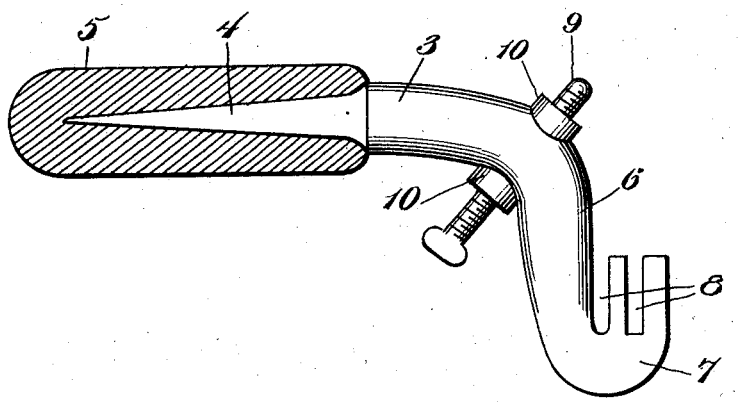

F. SIKOWSKI.
SAW SET.
APPLICATION FILED DEC. 11, 1919.

1,391,910. Patented Sept. 27, 1921.

Inventor
F. Sikowski

UNITED STATES PATENT OFFICE.

FRANK SIKOWSKI, OF MOUNT CARMEL, PENNSYLVANIA.

SAW-SET.

1,391,910.  Specification of Letters Patent.  Patented Sept. 27, 1921.

Application filed December 11, 1919. Serial No. 344,108.

*To all whom it may concern:*

Be it known that I, FRANK SIKOWSKI, a citizen of the United States, residing at Mount Carmel, in the county of Northumberland and State of Pennsylvania, have invented new and useful Improvements in Saw-Sets, of which the following is a specification.

This invention relates to saw sets, and aims primarily to provide a tool which shall be of simple and inexpensive construction capable of being readily operated so as to properly set the teeth of the saw at the desired angle, and which may be readily adjusted so as to vary the inclination of the teeth as desired.

This object, as well as others which will appear as the description proceeds, is attained by use of the device described more fully hereinafter, illustrated in the drawing, and particularly pointed out in the claims.

Figure 2:
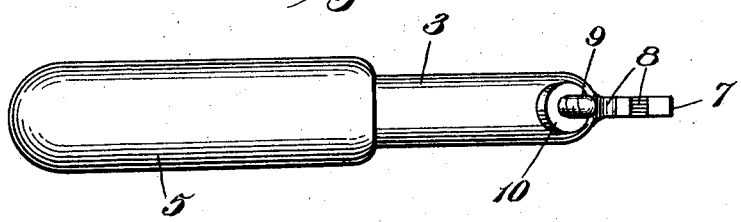

In the drawing,

Figure 1 is a side elevation of a saw set constructed in accordance with the invention, the handle of the tool being shown in section, and Fig. 2 is a top plan view of the improved saw set.

Referring now to the drawing, 3 indicates the shank of the saw set tool, one end of the same being reduced and pointed as at 4 to be engaged in the hand grip element indicated at 5. The other end of the shank is bent angularly as shown, providing an arm 6, and the extremity of this arm is reduced in thickness and flattened and is extended forwardly so as to provide a foot 7. This foot is notched as at 8, the said notches being of a width substantially equal to or a trifle greater than the thickness of the ordinary saw blade. The notches 8 are open at their upper ends to permit of the application of a saw blade thereto, and these notches are arranged in spaced parallel relation, being also parallel with the arm 6.

The shank 3 at the juncture of the angular arm 6 therewith may be provided with a threaded aperture to receive the adjusting or setting pin 9, bosses 10 being formed upon the shank to receive the pin and the threads thereof. This pin extends at an angle to the arm 6 and also the shank 3, and is disposed so as to be capable of engaging the teeth of a saw resting in either of the spaced notches 8 on the foot.

The use of the set will be readily understood, and the angularity of the teeth of the saw in setting the latter will be determined by the adjustment of the member 9. By disposing the element 9 at the angle shown, the strains upon the stem and its threads will be relieved, as the pressures incident to the setting operation will be delivered to the shank 3 through the walls of the opening receiving stem rather than to the stem itself.

Having thus fully described my invention, I claim:—

1. In a saw set, a shank, an arm disposed at an angle to said shank and formed integral with the latter, a foot at the outer end of said arm, the said foot having a recess in the upper edge thereof, the said recess being disposed parallel to said arm, and a screw threaded through said arm and movable toward or away from the plane of the recess.

2. In a saw set, a shank, one end of said shank being bent at substantially right angles to provide an arm, a foot at the lower end of said arm and extending laterally beyond the latter, the upper edge of said foot having parallel recesses therein, the said recesses being parallel to the said arm, and a screw threaded in said shank at the juncture of the arm therewith and having its inner end movable into or out of the planes of said recesses.

In testimony whereof I affix my signature.

FRANK SIKOWSKI.